Sept. 11, 1962

W. S. BACHMAN 3,053,943

PHONOGRAPH RECORD CUTTER

Filed July 12, 1957

INVENTOR
WILLIAM S. BACHMAN
BY
Brumbaugh, Free, Graves & Donohue
HIS ATTORNEYS 3,053,943
PHONOGRAPH RECORD CUTTER
William S. Bachman, Southport, Conn., assignor to Columbia Broadcasting System, Inc., New York, N.Y., a corporation of New York
Filed July 12, 1957, Ser. No. 671,653
7 Claims. (Cl. 179—100.41)

This invention relates to phonograph record cutting apparatus and more particularly to new and improved apparatus for cutting double modulated groove phonograph records.

Recently, public interest has been revived in so-called "binaural" or "stereophonic" sound reproduction. In this technique, a directional effect is achieved by using spaced apart sound reproducers powered from separate channels responsive, respectively, to sound pickup devices located in spaced spart relation to a source of sound to be reproduced. This interest has created a demand for a grooved phonograph record having formed therein two channels required for binaural sound reproduction. While techniques have bene proposed heretofore for cutting two modulation tracks in a single record groove, this has not been feasible for lack of suitable apparatus for cutting the double modulated grooves in the record. Such apparatus as has been proposed for the purpose has usually involved considerable mass at the stylus or a complicated low compliance coupling between the plural drivers for the stylus. As a result, it has not been possible previously to produce double modulated groove records of good quality on a commercial basis.

It is an object of the invention, accordingly, to provide new and improved phonograph record cutter apparatus which is capable of cutting double modulated groove records of a quality comparable with the best phonograph records now available commercially.

Another object of the invention is to provide new and improved phonograph cutter apparatus of the above character which is simple in construction yet highly effective in operation.

According to the invention, a double modulated groove record cutter is provided which comprises a pair of similar, angularly spaced apart electromechanical transducers coupled in driving relation to a record cutting stylus lying in a plane bisecting the two transducers. The transducers are adapted to apply forces to the stylus along mutually perpendicular axes, respectively, which intersect at the stylus. The coupling between the transducers at the stylus is through a high compliance hinge member which provides a hinge point substantially at the intersection of the mutually perpendicular axes of the transducers along which forces are applied to the stylus. Each transducer is coupled to the stylus through a light, rigid structure, preferably conical in shape, which converges from the transducer to the stylus. Also, the driver elements of the transducers are suspended at or very near their centers of percussion in such fashion as to permit both axial motion and angular oscillatory motion of the axis about a center which is substantially in the plane of the suspension. Hence, any shift in the apparent mass at the apex, in going through the critical frequency, is avoided or at least minimized.

Additional objects and advantages of the invention will be apparent from the following detailed description of a representative embodiment thereof, taken in conjunction with the accompanying drawings, in which.

Figure 1:
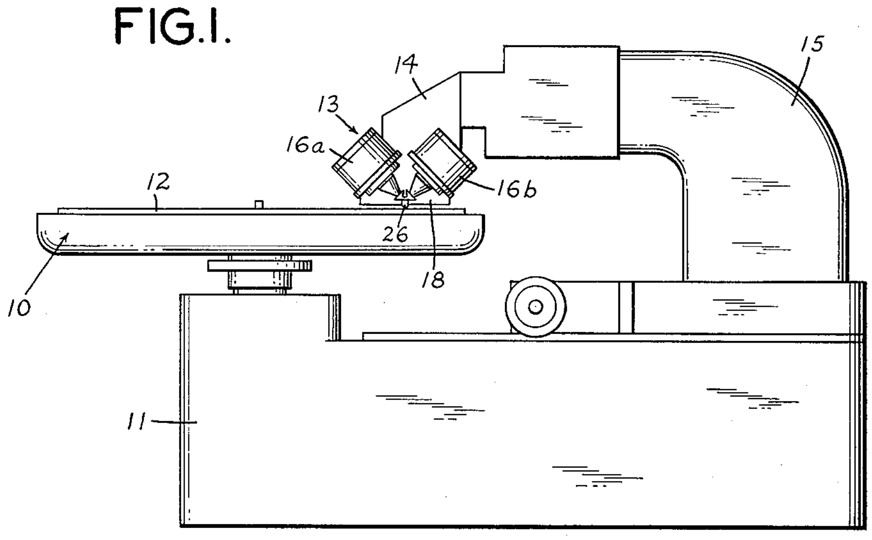
FIG. 1 is a view in elevation of recording apparatus incorporating a recording head constructed according to the invention.

FIG. 1 shows a conventional record cutting lathe incorporating a novel cutting head for cutting double modulated groove records in accordance with the invention. The record cutting apparatus comprises the usual massive turntable 10 which is mounted for rotation about a vertical axis in suitable bearings journaled in a bedplate 11. The turntable 10 is adapted to receive the usual wax master 12 in which double modulated grooves are adapted to be cut by a cutting head 13 mounted on an arm 14 secured to a support 15 carried by the bedplate 11. The depth of the cut made by the cutting head 13 may be adjusted in the conventional manner by a so-called advance ball (not shown) which is adapted to support the weight of the cutting head 13 and the arm 14 on which it is mounted. Aside from the cutting head 13, the construction of the record cutting lathe is conventional and it need not be described in detail herein.

The cutting head 13 comprises a pair of electromagnetic transducers 16*a* and 16*b* which are secured in angularly spaced apart relation to one another on a plate 18 fastened to the arm 14, the angular spacing depending upon the particular type of double modulated groove desired. For mutually perpendicular modulation tracks cut in a single record groove at 45° to the record surface, the transducers 16*a* and 16*b* should be disposed 90° apart at angles of 45° with respect to the vertical.

The transducers 16*a* and 16*b* are quite similar in construction and it will be necessary to describe only one of them in detail, corresponding parts in the other being designated by like reference numerals with the subscript *b*.

Figure 2:
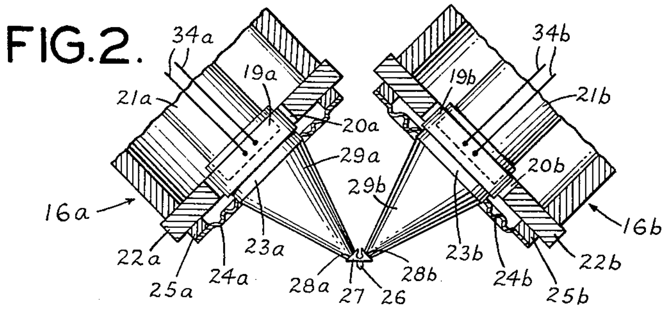
FIG. 2 is a front view, partly in longitudinal section, of the recording head in the apparatus of FIG. 1.

Referring now to FIG. 2, the transducers 16*a* comprises a motor of the type that has been commonly employed in electrodynamic loudspeakers. It includes a circular voice coil 19*a* mounted for edgewise displacement in a substantially annular airgap 20*a* formed in a magnetic circuit including a central pole member 21*a* and a cooperating pole structure 22*a*. The voice coil 19*a* is secured on a substantially cylindrical tubular support 23*a* resiliently suspended by an annular spider 24*a* of the usual kind, having concentric corrugations formed therein. The spider 24*a* is adapted to maintain the voice coil 19*a* normally centered in the airgap 20*a* and it is secured at its outer periphery to a ring-like member 25*a* fastened to the front face of the transducer 16*a*.

The voice coils 19*a* and 19*b* are adapted to drive jointly a conventional cutting stylus 26 disposed in a plane bisecting the angle between the transducers 16*a* and 16*b* and in the vicinity of the point of intersection of the longitudinal axes of the voice coils 19*a* and 19*b*. To this end, the stylus 26 is secured to the lower face of a light, substantially traingular, prism-shaped element 27 having mutually perpendicular faces 28*a* and 28*b* lying substantially parallel to the planes of the voice coils 19*a* and 19*b*, respectively.

The voice coil 19*a* is coupled in driving relation to the element 27 by a lightweight, rigid coupling member 29*a*, preferably frusto-conical in shape, cemented or otherwise secured at its upper end to the tubular voice coil support 29*a*. At its other open end, the coupling member is snugly fitted over a substantially circular boss 30*a* on the element 27 to which it is cemented or otherwise fastened.

In similar fashion, coupling between the voice coil 19*b* and the element 27 is effected by a conical coupling member 29*b* secured at its upper end to the voice coil support 23*b* and at its lower open end to a boss 30*b* formed on the stylus carrying element 27.

In order to prevent the masses of the moving systems of the transducers 16*a* and 16*b* from adversely affecting one another, the compliance of the coupling between them through the element should be considerably higher, say at least ten times higher than the compliance of either system at the apex of the corresponding conical coupling member. This may be accomplished by forming in the stylus carrying element 27 a narrow slot 31 bisecting the angle between the conical structures **29*a* and 29*b* and communicating with a bore 32 perpendicular to the plane of the paper, forming a flexible coupling or hinge 33 of the requisite high compliance about which the respective portions of the stylus carrying member 27 secured to the conical coupling members 29*a* and 29*b* may pivot. Preferably, the design is such that the hinge 33 is located substantially at the apices of the two conical coupling members 29*a* and 29*b***.

By virtue of the structure described, the compliance of the hinge 33 is large so that only a small part of the mass of the moving system of one transducer is coupled to the moving system of the other. Thus, the hinge 33 reduces the parasitic mass contributed by each moving coil system to the other and causes all the forces of the reflected effective mass acceleration of one coil system to be applied on the axis of the other coil system.

According to an important feature of the invention, the moving coil system comprising the voice coil **19*a*, the support 23*a* and the conical coupling member 29*a* is suspended on the spider 24*a* at or very near its center of percussion and the moving coil system comprising the voice coil 19*b*, the support 23*b* and the conical coupling member 29*b* is similarly supported by the spider 24*b*. As a result, any shift in the apparent mass at the apices of the conical coupling members 29*a* and 29*b***, in going through the critical frequency is avoided, or at least minimized. Further, the two coil systems are suspended so as to be capable of both axial movement and angular oscillatory movement about their centers of percussion so that when either one is being driven longitudinally, the other oscillates about its suspension near the center of percussion.

In a typical cutting head according to the invention, the voice coils **19*a* and 19*b* may be from one-half to three-quarters of an inch in diameter; the conical coupling members 29*a* and 29*b* may be made of stiff sheet paper stock held in shape by a close-fitting block of Styrofoam or other light material, if necessary, and with apex angles of, say 41°, although this is not at all critical; and the hinge 33** should be designed, according to good engineering practice, to have say ten or more times the compliance at the apex of either conical coupling member.

In operation, let it be assumed that outputs from either or both of two different modulation channels are supplied to the voice coils **19*a* and 19*b* through the conductors 34*a* and 34*b*, respectively. Any signal applied to the conductors 34*a* will cause the voice coil 19*a* to be displaced longitudinally in its airgap 20*a* and, acting through conical coupling member 29*a*, will cause the stylus 26 to cut a groove in a direction downwardly to the right at an angle of 45° to the surface of the record 12 (FIG. 1). While this is taking place, the moving system of the other transducer 16*b* will oscillate angularly about a center in the plane of the spider 24*b*. Similarly, any output supplied to the conductors 34*b* will cause longitudinal displacement of the voice coil 19*b* in its airgap 20*b*, and, acting through the conical coupling member 29*b*, will cause the stylus 26 to cut a groove in a direction downwardly to the left at an angle of 45° to the record 12. Now it is the moving system of the transducer 16*a* which oscillates angularly about a center which is located in the plane of the spider 24*a*. If inputs are supplied to both of the voice coils 19*a* and 19*b*, then the groove cut by the stylus 26 will be the resultant of the two motions in the two directions at 45° to the surface of the record 12**.

From the foregoing, it will be apparent that the invention provides highly effective record cutter apparatus which is capable of cutting double-modulated groove records of good quality. By virtue of the high compliance flexible hinge which couples the conical stylus driving members, only a small part of the mass of the moving system of any one transducer is coupled to the other. Also, by mounting the moving systems of the transducers at, or very near their centers of percussion in such fashion as to be capable of both axial motion and angular oscillatory motion about their centers of percussion, each moving coil system can act on the stylus without being adversely affected by the other. Also, any shift in the apparent masses at the apices of the conical coupling members in going through the critical frequency is avoided or at least minimized.

Figure 3:
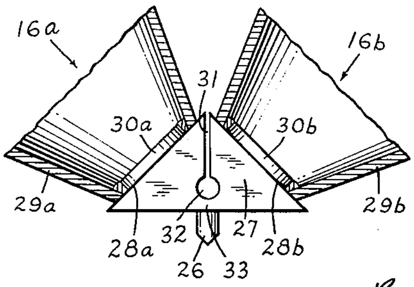
FIG. 3 is an enlarged view of part of the cutting head of FIG. 2 showing the stylus assembly and the couplings to the two drivers.

The specific structures shown in FIGS. 2 and 3 are obviously susceptible of considerable modification in form and detail within the scope of the invention. For example, the conical coupling members **29*a* and 29*b*** may be made of turned metal such as aluminum, say .005" thick, instead of paper. Other variations will be readily apparent to those skilled in the art. The specific embodiment disclosed herein is intended to be merely illustrative and the invention is not to be limited thereto but encompasses all modifications thereof coming within the scope of the following claims.

I claim:

1. In electromagnetic transducer apparatus, the combination of first and second electromagnetic transducers having movable elements respectively displaceable longitudinally along axes which are angularly disposed and have an intersection, a coupling member having two rigid portions connected to said movable elements respectively and a portion of increased compliance joining said two rigid portions located substantially at the intersection of the axes, and stylus means carried by the coupling member adjacent to said compliant portion.

2. In electromagnetic transducer apparatus, the combination of first and second electromagnetic transducers provided with movable elements having longitudinal axes which are angularly disposed and have an intersection, means mounting each of said movable elements for linear displacement along its longitudinal axis and for angular displacement, a coupling member having two rigid portions connected to said movable elements respectively and a portion of increased compliance joining said two rigid portions located substantially at the intersection of the axes, and stylus means carried by the coupling member adjacent to said compliant portion.

3. In electromagnetic transducer apparatus, the combination of first and second electromagnetic transducers provided with movable elements having longitudinal axes which are angularly disposed and have an intersection, each of said elements including motor means connected in driving relation to a rigid driving member extending toward said intersection, means mounting each of said movable elements for linear displacement along its longitudinal axis and for angular displacement, a coupling member having two rigid portions connected to said driving members respectively and a portion of increased compliance joining said two rigid portions located substantially at the intersection of the axes, and stylus means carried by the coupling member adjacent to said compliant portion.

4. In electromagnetic transducer apparatus, the combination of first and second electromagnetic transducers provided with movable elements having longitudinal axes which are angularly disposed and have an intersection, each of said elements including motor means connected in driving relation to a rigid driving member extending toward said intersection, means mounting each of said movable elements substantially at the center of percussion thereof for linear displacement along its longitudinal axis and for angular displacement of said axis about said center, a coupling member having two rigid portions connected to said driving members respectively and a portion of increased compliance joining said two rigid portions located substantially at the intersection of the axes, the compliance of said portion of increased compliance being at least ten times the compliance of either movable element at the place of its connection to said coupling means, and stylus means carried by said coupling member adjacent to said compliant portion.

5. In a double modulated groove record cutter, the combination of a pair of similar electromechanical transducers provided with movable motor elements having angularly spaced apart axes, respectively, which have an intersection, means mounting each of said motor elements for displacement along its axis and for angular oscillation, a pair of light, rigid driving members having ends disposed adjacent to the intersection of the axes and connected at their other ends to said respective transducer motor elements, a coupling member having two rigid portions connected to said driving members respectively and a portion of increased compliance joining said two rigid portions located substantially at the intersection of the axes, and stylus means secured to said compliant portion and lying in a plane bisecting said angularly spaced apart axes.

6. In a double modulated groove record cutter, the combination of a pair of similar electromechanical transducers provided with movable elements having angularly spaced apart axes, respectively, which have an intersection and each including a motor element secured to the base of a light, conical driving member having an apex disposed adjacent to the intersection of the axes, resilient means mounting each transducer movable element for linear displacement along its axis and for angular oscillation, a coupling member comprising two rigid blocks connected to the apices of said conical driving members respectively and a compliant portion of reduced cross-sectional area joining said blocks located substantially at the intersection of the axes, and stylus means secured to said compliant portion and lying in a plane bisecting said angularly spaced apart axes.

7. In a double modulated groove record cutter, the combination of a pair of similar electromechanical transducers provided with movable elements having mutually perpendicular axes, respectively, which have an intersection and each including a motor element secured to a light, conical driving member having an apex positioned adjacent to the intersection of the axes, means mounting each transducer movable element resiliently substantially at its center of percussion for linear displacement along its axis and for angular oscillation of said axis substantially about said center of percussion, a coupling member comprising two rigid blocks connected to the apices of said driving members respectively, and a compliant portion of reduced cross-sectional area joining said blocks and located substantially at the intersection of the axes, the compliance of said compliant portion being at least ten times the compliance of either transducer movable element at the apex of the driving member secured thereto, and stylus means secured to said compliant portion and lying in a plane bisecting said mutually perpendicular axes.

References Cited in the file of this patent

UNITED STATES PATENTS

| | | |
|---|---|---|
| 1,804,961 | Thomas | May 12, 1931 |
| 1,855,151 | Jones | Apr. 19, 1932 |
| 2,027,168 | Harrison | Jan. 7, 1936 |
| 2,055,187 | Vieth | Sept. 22, 1936 |
| 2,093,540 | Blumlein | Sept. 21, 1937 |
| 2,105,916 | Harrison | Jan. 18, 1938 |
| 2,114,471 | Keller et al. | Apr. 19, 1938 |
| 2,864,897 | Kaar | Dec. 16, 1958 |
| 2,875,282 | Reiback | Feb. 24, 1959 |